United States Patent
Genkin et al.

(10) Patent No.: US 10,562,769 B1
(45) Date of Patent: Feb. 18, 2020

(54) DUAL PRODUCT H₂ AND CO PRODUCTION WITH CO TURNDOWN

(71) Applicant: Air Products and Chemicals, Inc., Allentown, PA (US)

(72) Inventors: Eugene S. Genkin, Allentown, PA (US); Kelly Ann Forester, Harleysville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 16/122,989

(22) Filed: Sep. 6, 2018

(51) Int. Cl.
*C01B 3/50* (2006.01)
*C01B 3/48* (2006.01)
*C01B 3/56* (2006.01)

(52) U.S. Cl.
CPC .............. *C01B 3/506* (2013.01); *C01B 3/48* (2013.01); *C01B 3/56* (2013.01); *C01B 2203/0283* (2013.01); *C01B 2203/042* (2013.01); *C01B 2203/046* (2013.01)

(58) Field of Classification Search
CPC .................................. C01B 3/506; C01B 3/48
USPC ....................................................... 423/418.2
See application file for complete search history.

(56) References Cited

U.S. PATENT DOCUMENTS

| | | |
|---|---|---|
| 5,030,440 A | 7/1991 | Lywood et al. |
| 5,351,491 A | 4/1994 | Fabian |
| 7,510,696 B2 | 3/2009 | Herb et al. |
| 7,695,708 B2 | 4/2010 | Peng et al. |
| 7,776,208 B2 | 8/2010 | Guo |
| 2007/0269690 A1 | 11/2007 | Doshi et al. |
| 2015/0152030 A1* | 6/2015 | Trott .......... C01B 3/12 518/704 |

FOREIGN PATENT DOCUMENTS

| | | |
|---|---|---|
| EP | 0816290 A1 | 1/1998 |
| EP | 1146009 A1 | 10/2001 |
| EP | 2565154 A2 | 3/2013 |

OTHER PUBLICATIONS

Smith R J et al., "A Review of the Water Gas Shift Reaction Kinetics", Int. J. of Chem. Reactor Engg, vol. 8, 2010.

* cited by examiner

*Primary Examiner* — Douglas B Call
(74) *Attorney, Agent, or Firm* — Bryan C. Hoke, Jr.; Larry S. Zelson (57) ABSTRACT

Process and apparatus for producing a H₂-containing product and a CO-containing product with CO-containing product turndown capability. The H₂-containing product is produced in a process train with a shift reactor and pressure swing adsorption unit. The CO-containing product is produced in a process train with a CO₂ removal unit and a cryogenic separation unit. During the CO-containing product turndown mode, a portion or all of the CO-containing product is passed to the shift reactor in the H₂-containing product train to form additional H₂.

15 Claims, 2 Drawing Sheets

DUAL PRODUCT H₂ AND CO PRODUCTION WITH CO TURNDOWN

BACKGROUND

The present disclosure relates to a process and apparatus for the production of a $H_2$-containing product and a CO-containing product with a CO-containing product turndown capability.

$H_2$ and CO can be produced from a common crude synthesis gas production unit using a first process train for producing the $H_2$ and a second process train for producing CO. The $H_2$ can be produced by passing a first portion of the crude synthesis gas to a shift reactor and passing the shifted and dewatered synthesis gas to a pressure swing adsorption unit. The CO can be produced by passing a second portion of crude synthesis gas to a $CO_2$ removal unit and passing the $CO_2$-depleted synthesis gas to a cryogenic separation unit.

Each of the process trains are designed for a specific production rate of their respective products.

When the requirement from the customer or downstream process for the CO is reduced or stopped (short or intermediate term), the flow rate of the crude synthesis gas to the second process train is reduced and the cryogenic separation unit is turned down. The problem is that the turn down for cryogenic separation units is limited, for example to 30% to 45% of their design capacity. When the requirement from the customer or downstream process for the CO is reduced below the turndown capability of the cryogenic separation unit, the unneeded CO is used as a fuel or flared.

Shutting down the CO producing train is problematic due to the long time required to start up the cryogenic separation unit and the $CO_2$ removal unit.

Shutting down the CO producing train may also be problematic due to effects on heat transfer equipment that is integrated between $H_2$-production train and the CO-production train.

Industry desires to be able to turn down CO production without having to flare the CO and/or minimizing the amount of CO used as fuel.

Industry desires to improve overall production efficiency during production turndown modes.

BRIEF SUMMARY

The present disclosure relates to a process and apparatus for the production of a $H_2$-containing product and a CO-containing product with a CO-containing product turndown capability.

There are several aspects of the invention as outlined below. In the following, specific aspects of the invention are outlined below. The reference numbers and expressions set in parentheses are referring to an example embodiment explained further below with reference to the figures. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. A process for producing a $H_2$-containing product (225) and a CO-containing product (185) with CO-containing product turndown capability, the process comprising:

producing a crude synthesis gas (115) in a production unit (100), and withdrawing the crude synthesis gas (115) from the production unit (100);

dividing the crude synthesis gas (115) into a first divided portion (115a) and a second divided portion (115b);

passing the first divided portion (115a) of the crude synthesis gas (115) to a shift reactor (200) as at least part of the feed (199) to the shift reactor (200), reacting the shift reactor feed in the shift reactor (200), and withdrawing a shift reactor effluent (116) from the shift reactor (200);

separating a pressure swing adsorption unit feed comprising at least a portion of the shift reactor effluent (116) from the shift reactor (200) in a pressure swing adsorption unit (220) to form the $H_2$-containing product (225) and a pressure swing adsorption unit by-product gas (221);

concurrent with passing the first divided portion (115a) of the crude synthesis gas (115) to the shift reactor (200), passing the second divided portion (115b) of the crude synthesis gas (115) to a $CO_2$ removal unit (160), separating $CO_2$ from the second divided portion (115b) in the $CO_2$ removal unit (160) to form a $CO_2$-depleted crude synthesis gas (161) and a $CO_2$-containing effluent (165);

separating a cryogenic separation unit feed (171) comprising at least a portion of the $CO_2$-depleted crude synthesis gas (161) in a cryogenic separation unit (cold box) (180) to form at least the CO-containing product (185), a $H_2$-rich stream (187), and a cryogenic separation unit by-product (181); and passing at least a portion (187a) of the $H_2$-rich stream (187) to the pressure swing adsorption unit as part of the pressure swing adsorption unit feed;

wherein the process comprises a primary operating mode and a secondary operating (CO turndown) mode;

wherein during the primary operating mode:

crude synthesis gas (115) is produced in the production unit (100), and the crude synthesis gas (115) is withdrawn from the production unit (100);

the crude synthesis gas (115) is divided into the first divided portion (115a) and the second divided portion (115b);

the first divided portion (115a) is passed to the shift reactor (200) as at least part of the feed (199) to the shift reactor (200), reacted in the shift reactor to form the shift reactor effluent (116), and the shift reactor effluent (116) is withdrawn from the shift reactor (200);

the pressure swing adsorption unit feed comprising the shift reactor effluent (116) is separated in the pressure swing adsorption unit (220) to form the $H_2$-containing product (225) and the pressure swing adsorption unit by-product gas (221);

concurrent with passing the first divided portion (115a) as feed (199) to the shift reactor (200), the second divided portion (115b) of the crude synthesis gas (115) is passed to the $CO_2$ removal unit (160), $CO_2$ is separated from the second divided portion (115b) in the $CO_2$ removal unit (160) to form the $CO_2$-depleted crude synthesis gas (161) and the $CO_2$-containing effluent (165);

the cryogenic separation unit feed comprising at least a portion of the $CO_2$-depleted crude synthesis gas (161) is separated in the cryogenic separation unit (cold box) (180) to form at least the CO-containing product (185), the $H_2$-rich stream (187), and the cryogenic separation unit by-product (181); and at least a portion (187a) of the H$_2$-rich stream (187) is passed to the pressure swing adsorption unit as part of the pressure swing adsorption unit feed; and wherein during the secondary operating mode:
crude synthesis gas (115) is produced in the production unit (100), and the crude synthesis gas (115) is withdrawn from the production unit (100);
the crude synthesis gas (115) is divided into a first divided portion (115a) and a second divided portion (115b);
the first divided portion (115a) is passed to the shift reactor (200) as at least part of the feed (199) to the shift reactor (200), reacted in the shift reactor to form the shift reactor effluent (116), and the shift reactor effluent (116) is withdrawn from the shift reactor (200);
the pressure swing adsorption unit feed comprising shift reactor effluent (116) is separated in the pressure swing adsorption unit (220) to form the H$_2$-containing product (225) and pressure swing adsorption unit by-product gas (221);
concurrent with passing the first divided portion (115a) as feed to the shift reactor (200), the second divided portion (115b) of the crude synthesis gas (115) is passed to the CO$_2$ removal unit (160), CO$_2$ is separated from the second divided portion (115b) in the CO$_2$ removal unit (160) to form the CO$_2$-depleted crude synthesis gas (161) and the CO$_2$-containing effluent (165);
the cryogenic separation unit feed comprising at least a portion of the CO$_2$-depleted crude synthesis gas (161) is separated in the cryogenic separation unit (cold box) (180) to form at least the CO-containing product (185), the H$_2$-rich stream (187), and the cryogenic separation unit by-product (181); and
at least a portion (187a) of the H$_2$-rich stream (187) is passed to the pressure swing adsorption unit as part of the pressure swing adsorption unit feed; and
a portion (189) or all of the CO-containing product (185) is passed to the shift reactor (200) as part of the feed (199) to the shift reactor (200).

Aspect 2. The process according to aspect 1 wherein a H$_2$-containing gas is introduced into the shift reactor (200) as part of the feed (199) to the shift reactor (200) during the secondary operating mode.

Aspect 3. The process according to aspect 2 wherein the H$_2$-containing gas is a portion (227) of the H$_2$-containing product (225).

Aspect 4. The process according to aspect 3 wherein the flow rate of the portion (227) of the H$_2$-containing product (225) passed to the shift reactor (200) as part of the feed (199) to the shift reactor (200) during the secondary operating mode is selected to maintain a temperature in the shift reactor below a target maximum temperature.

Aspect 5. The process according to aspect 3 or aspect 4 wherein the flow rate of the portion (227) of the H$_2$-containing product (225) passed to the shift reactor (200) as part of the feed (199) to the shift reactor (200) during the secondary operating mode is selected to maintain a temperature of the shift reactor effluent (116) leaving the shift reactor below a target maximum temperature.

Aspect 6. The process according to aspect 2 wherein the H$_2$-containing gas is a portion (187b) of the H$_2$-rich stream (187).

Aspect 7. The process according to aspect 6 wherein the flow rate of the portion (187b) of the H$_2$-rich stream (187) passed to the shift reactor (200) as part of the feed (199) to the shift reactor (200) during the secondary operating mode is selected to maintain a temperature in the shift reactor below a target maximum temperature.

Aspect 8. The process according to aspect 6 or aspect 7 wherein the flow rate of the portion (187b) of the H$_2$-rich stream (187) passed to the shift reactor (200) as part of the feed (199) to the shift reactor (200) during the secondary operating mode is selected to maintain a temperature of the shift reactor effluent (116) leaving the shift reactor below a target maximum temperature.

Aspect 9. The process according to any one of aspects 1 to 8 wherein additional steam (209) is passed to the shift reactor (200) as part of the feed (199) to the shift reactor (200) during the secondary operating mode.

Aspect 10. The process according to aspect 9 wherein the shift reactor contains an iron-based shift catalyst, and wherein the flow rate of the additional steam (209) passed to the shift reactor (200) as part of the feed (199) to the shift reactor (200) during the secondary operating mode is selected to prevent over-reduction of the iron-based shift catalyst.

Aspect 11. The process according to aspect 9 wherein the flow of the additional steam (209) passed to the shift reactor (200) as part of the feed (199) to the shift reactor (200) during the secondary operating mode is controlled to maintain a temperature in the shift reactor below a target maximum temperature.

Aspect 12. The process according to aspect 9 wherein the flow of the additional steam (209) passed to the shift reactor (200) as part of the feed (199) to the shift reactor (200) during the secondary operating mode is controlled to maintain a temperature of the shift reactor effluent (116) leaving the shift reactor (200) below a target maximum temperature.

Aspect 13. The process according to any one of the preceding aspects wherein none of the CO-containing product (185) is passed to the shift reactor (200) as part of the feed to the shift reactor during the primary operating mode.

Aspect 14. The process according to any one of the preceding aspects wherein all of the CO-containing product (185) is passed to the shift reactor (200) as part of the feed to the shift reactor during the secondary operating mode.

Aspect 15. The process according to any one of aspects 1 to 13 wherein a portion (183) of the CO-containing product (185) is passed to the production unit (100) as a feed to the production unit (100) during the secondary operating mode.

Aspect 16. The process according to any one of the preceding aspects wherein the pressure swing adsorption unit by-product gas (221) is passed to the production unit (100) as a feed to the production unit (100) during the primary operating mode and during the secondary operating mode.

Aspect 17. The process according to any one of the preceding aspects wherein the cryogenic separation unit by-product (181) is passed to the production unit (100) as a feed to the production unit during the primary operating mode and during the secondary operating mode.

Aspect 18. The process according to any one of the preceding aspects wherein the shift reactor (200) contains an iron-based shift catalyst (a so-called high temperature shift catalyst).

Aspect 19. The process according to any one of the preceding aspects further comprising:
separating the CO$_2$-depleted crude synthesis gas (161) from the CO$_2$-removal unit (160) in a temperature swing adsorption unit (170) to form the cryogenic separation unit feed (171) and a temperature swing adsorption unit by-product gas (175).

Aspect 20. The process according to any one of the preceding aspects wherein heat is recovered from the shift reactor effluent (116) prior to being introduced into the pressure swing adsorption unit (220).

Aspect 21. The process according to any one of the preceding aspects wherein the production unit (100) is a catalytic steam-hydrocarbon reformer (102), and wherein during the primary operating mode and during the secondary operating mode:
- a reformer feed gas (101) is introduced into a plurality of catalyst-containing reformer tubes (110) in the catalytic steam-hydrocarbon reformer (102), the reformer feed gas (101) is reacted in a reforming reaction under reaction conditions effective to form a reformate comprising $H_2$, CO, $CH_4$, and $H_2O$, and the reformate is withdrawn from the plurality of catalyst-containing reformer tubes (110) of the catalytic steam-hydrocarbon reformer (102) as the crude synthesis gas (115); and
- a fuel (105) is combusted with an oxidant (103) in the catalytic steam-hydrocarbon reformer (102) external to the plurality of catalyst-containing reformer tubes (110) under reaction conditions effective to combust the fuel 105 to form a combustion product gas (125) and generate heat to supply energy for reacting the reformer feed gas (101) inside the plurality of catalyst-containing reformer tubes (110), and the combustion product gas (125) is withdrawn from the catalytic steam-hydrocarbon reformer (102).

Aspect 22. The process according to any one of the preceding aspects wherein the process is designed to produce the CO-containing product (185) at a design capacity molar flow rate, the CO-containing product (185) produced at the design capacity molar flow rate during the primary operating mode, wherein the portion (189) or all of the CO-containing product (185) is passed to the shift reactor (200) at a secondary molar flow rate as part of the feed to the shift reactor (200) during the secondary operating mode, and wherein the secondary molar flow rate is at least 10% or at least 20% of the design capacity molar flow rate and preferably less than 50% or less than 40% of the design capacity molar flow rate.

Aspect 23. The process according to any one of the preceding aspects in combination with aspect 2, wherein the flow rate of the $H_2$-containing gas (187b, 227) passed to the shift reactor (200) as part of the feed to the shift reactor (200) during the secondary operating mode is selected to maintain a temperature in the shift reactor below a target maximum temperature and/or to maintain a temperature of the shift reactor effluent (116) leaving the shift reactor (200) below a target maximum temperature.

Aspect 24. The process according to the preceding aspect wherein the temperature in the shift reactor (200) and/or the temperature of the shift reactor effluent (116) leaving the shift reactor (200) is/are measured, the respective measured temperature is compared with the respective associated target maximum temperature, and the flow rate of the $H_2$-containing gas passed to the shift reactor (200) is adjusted responsive to the comparison, e.g. responsive to the difference between the respective measured temperature and the respective associated target maximum temperature and/or responsive to the ratio of the respective measured temperature and the respective associated target maximum temperature.

Aspect 25. An apparatus for producing a $H_2$-containing product (225) and a CO-containing product (185) with CO-containing product turndown capability, the apparatus comprising
- a production unit (100) for producing a crude synthesis gas (115), the production unit (100) having an inlet for a carbonaceous feed and an outlet;
- a shift reactor (200) having an inlet and an outlet, the inlet of the shift reactor (200) in fluid flow communication with the outlet of the production unit (100);
- a pressure swing adsorption unit (220) having an inlet, a first outlet, and a second outlet, the inlet of the pressure swing adsorption unit (220) in fluid flow communication with the outlet of the shift reactor (200);
- a $CO_2$ removal unit (160) having an inlet, a first outlet and a second outlet, the inlet of the $CO_2$ removal unit (160) in fluid flow communication with the outlet of the production unit (100);
- a cryogenic separation unit (180) having an inlet, a first outlet, a second outlet, and a third outlet, the inlet in fluid flow communication with the first outlet of the $CO_2$ removal unit (160);
- a first process gas transfer line, wherein the inlet of the shift reactor (200) is in fluid flow communication with the first outlet of the cryogenic separation unit (180) via the first process gas transfer line; and
- a second process gas transfer line, wherein the inlet of the pressure swing adsorption unit (220) is in fluid flow communication with the second outlet of the cryogenic separation unit (180) via the second process gas transfer line.

Aspect 26. The apparatus according to aspect 25 further comprising
- a third process gas transfer line for passing a $H_2$-containing gas to the inlet of the shift reactor (200).

Aspect 27. The apparatus according to aspect 26 wherein the third process gas transfer line provides fluid flow communication between the first outlet of the pressure swing adsorption unit (220) and the inlet of the shift reactor (200), wherein the $H_2$-containing gas comprises a portion (227) of the $H_2$-containing product (225).

Aspect 28. The apparatus according to aspect 26 wherein the third process gas transfer line provides fluid flow communication between the second outlet of the cryogenic separation unit (180) and the inlet of the shift reactor (200), wherein the $H_2$-containing gas comprises a portion (187b) of the $H_2$ rich stream (187) from the second outlet of the cryogenic separation unit (180).

Aspect 29. The apparatus according to any one of the preceding aspects 25 to 28 further comprising
- a fourth process gas transfer line for passing additional steam (209) to the inlet of the shift reactor (200).

Aspect 30. The apparatus according to any one of the preceding aspects 25 to 29
- wherein the outlet of the production unit is for discharging a crude synthesis gas (115) formed in the production unit;
- wherein the inlet of the shift reactor (200) is operatively disposed to receive a first divided portion of the crude synthesis gas (115) discharged from the outlet of the production unit;
- wherein the inlet of the pressure swing adsorption unit (220) is operatively disposed to receive at least a portion of a shift reactor effluent ($H_2O$-depleted) from the outlet of the shift reactor (200), the first outlet of the pressure swing adsorption unit (220) is for discharging the $H_2$-containing product (225), and the second outlet of the pressure swing adsorption unit (220) is for discharging a pressure swing adsorption unit by-product gas (221);

wherein the inlet of the $CO_2$ removal unit (160) is operatively disposed to receive a second divided portion of the crude synthesis gas withdrawn from the outlet of the production unit, the first outlet of the $CO_2$ removal unit (160) is for discharging a $CO_2$-depleted crude synthesis gas (161), and the second outlet of the $CO_2$ removal unit is for discharging a $CO_2$-containing effluent (165);

wherein the inlet of the cryogenic separation unit (180) is operatively disposed to receive at least a portion of the $CO_2$-depleted crude synthesis gas (161) from the outlet of the $CO_2$-removal unit (160), the first outlet of the cryogenic separation unit (180) is for discharging a CO-containing product (185), and the second outlet of the cryogenic separation unit (180) is for discharging a $H_2$-rich stream (187);

wherein the first process gas transfer line is for passing a portion (189) or all of the CO-containing product (185) from the first outlet of the cryogenic separation unit (180) to the inlet of the shift reactor (200);

wherein the second process gas transfer line is for passing at least a portion (187a) of the $H_2$-rich stream (187) from the second outlet of the cryogenic separation unit (180) to the inlet of the pressure swing adsorption unit (220).

Aspect 31. The apparatus according to any one of the preceding aspects 25 to 30 further comprising a temperature swing adsorption unit (170) having an inlet, a first outlet, and a second outlet, the inlet of the temperature swing adsorption unit (170) in fluid flow communication with the first outlet of the $CO_2$ removal unit (160), and the inlet of the cryogenic separation unit (180) in fluid flow communication with the first outlet of the temperature swing adsorption unit (170).

Aspect 32. The apparatus according to any one of the preceding aspects 25 to 31 wherein the production unit is a partial oxidation unit (e.g. gasification unit), a catalytic steam-hydrocarbon reformer, or an autothermal reformer.

Aspect 33. The apparatus according to any one of the preceding aspects 25 to 32 wherein the production unit is a catalytic steam-hydrocarbon reformer (102) having a combustion section (120), the combustion section (120) containing a plurality of catalyst-containing reformer tubes (110), each of the plurality of catalyst-containing reformer tubes (110) having an inlet and an outlet, wherein the outlet of the production unit (100) is in fluid flow communication with the outlet of each of the plurality of catalyst-containing reformer tubes (110).

Aspect 34. The apparatus according to any one of the preceding aspects 25 to 33 further comprising a heat transfer network (210) to recover heat and remove water from the crude synthesis gas discharged from the shift reactor (200).

Aspect 35. The apparatus according to any one of aspects 25 to 34 comprising a regulating means, for example one or more regulating valves and/or one or more shut-off valves, for regulating the molar flow rate of CO-containing product (185) from the first outlet of the cryogenic separation unit (180) to the inlet of the shift reactor (200).

Aspect 36. The apparatus according to any one of aspect 25 to 35 comprising a compressor disposed in the first process gas transfer line for compressing the CO-containing product (185) when passed from the first outlet of the cryogenic separation unit (180) to the inlet of the shift reactor (200).

DETAILED DESCRIPTION OF THE PREFERRED EMBODIMENTS

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from the scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all indiscriminately of whatever quantity.

In this specification, unless expressly otherwise indicated, the word "or" is used in the sense of an operator that returns a true value when either or both of the stated conditions are met, as opposed to the operator "exclusive or" which requires only that one of the conditions is met.

The term "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The phrase "at least one of" preceding a list of features or entities means one or more of the features or entities in the list of entities, but not necessarily including at least one of each and every entity specifically listed within the list of entities and not excluding any combinations of entities in the list of entities. For example, "at least one of A, B, or C" (or equivalently "at least one of A, B, and C" or equivalently "at least one of A, B, and/or C") has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The term "plurality" means "two or more than two."

The phrase "at least a portion" means "a portion or all." The at least a portion of a stream may have the same composition with the same concentration of each of the species as the stream from which it is derived. The at least a portion of a stream may have a different concentration of species than that of the stream from which it is derived. The at least a portion of a stream may include only specific species of the stream from which it is derived.

As used herein a "divided portion" of a stream is a portion having the same chemical composition and species concentrations as the stream from which it was taken.

As used herein a "separated portion" of a stream is a portion having a different chemical composition and different species concentrations than the stream from which it was taken.

As used herein, "first," "second," "third," etc. are used to distinguish from among a plurality of steps and/or features, and is not indicative of the total number, or relative position in time and/or space unless expressly stated as such.

The terms "depleted" or "lean" mean having a lesser mole % concentration of the indicated component than the original stream from which it was formed. "Depleted" does not mean that the stream is completely lacking the indicated component.

The terms "rich" or "enriched" mean having a greater mole % concentration of the indicated component than the original stream from which it was formed.

As used herein, "in flow communication" or "in fluid flow communication" or "in fluid communication" mean operatively connected by one or more conduits, manifolds, valves and the like, for transfer of fluid. A conduit is any pipe, tube, passageway or the like, through which a fluid may be conveyed. An intermediate device, such as a pump, compressor or vessel may be present between a first device in fluid flow communication with a second device unless explicitly stated otherwise.

"Downstream" and "upstream" refer to the intended flow direction of the process fluid transferred. If the intended flow direction of the process fluid is from the first device to the second device, the second device is in downstream fluid flow communication of the first device. In case of a recycle stream, downstream and upstream refer to the first pass of the process fluid.

As used in this application, the terms "cryogenic separation," "cryogenically separating" mean that a mixture is separated by a separation process, for example condensation, distillation and/or fractionation, operating with a minimum temperature below the temperature required to condense at least one component from the mixture at operating pressure. Usually, said minimum temperature will be below −60° F. (−50° C.), preferably below −150° F. (−100° C.).

Non-cryogenic separation includes other forms of separation, for example sorption and membrane separation.

Illustrative embodiments of the process and apparatus are described below. While the process and apparatus are susceptible to various modifications and alternative forms, specific embodiments thereof have been shown by way of example in the drawings and are herein described in detail. It should be understood, however that the description herein of specific embodiments is not intended to limit the invention to the particular forms disclosed, but on the contrary, the invention is to cover all modifications, equivalents, and alternatives falling within the scope of the invention as defined by the appended claims.

The present disclosure relates to a process and apparatus for the production of a $H_2$-containing product and a CO-containing product with the capability to turn down the production rate of the CO-containing product.

The process and apparatus are described with reference to the figures.

Figure 1:
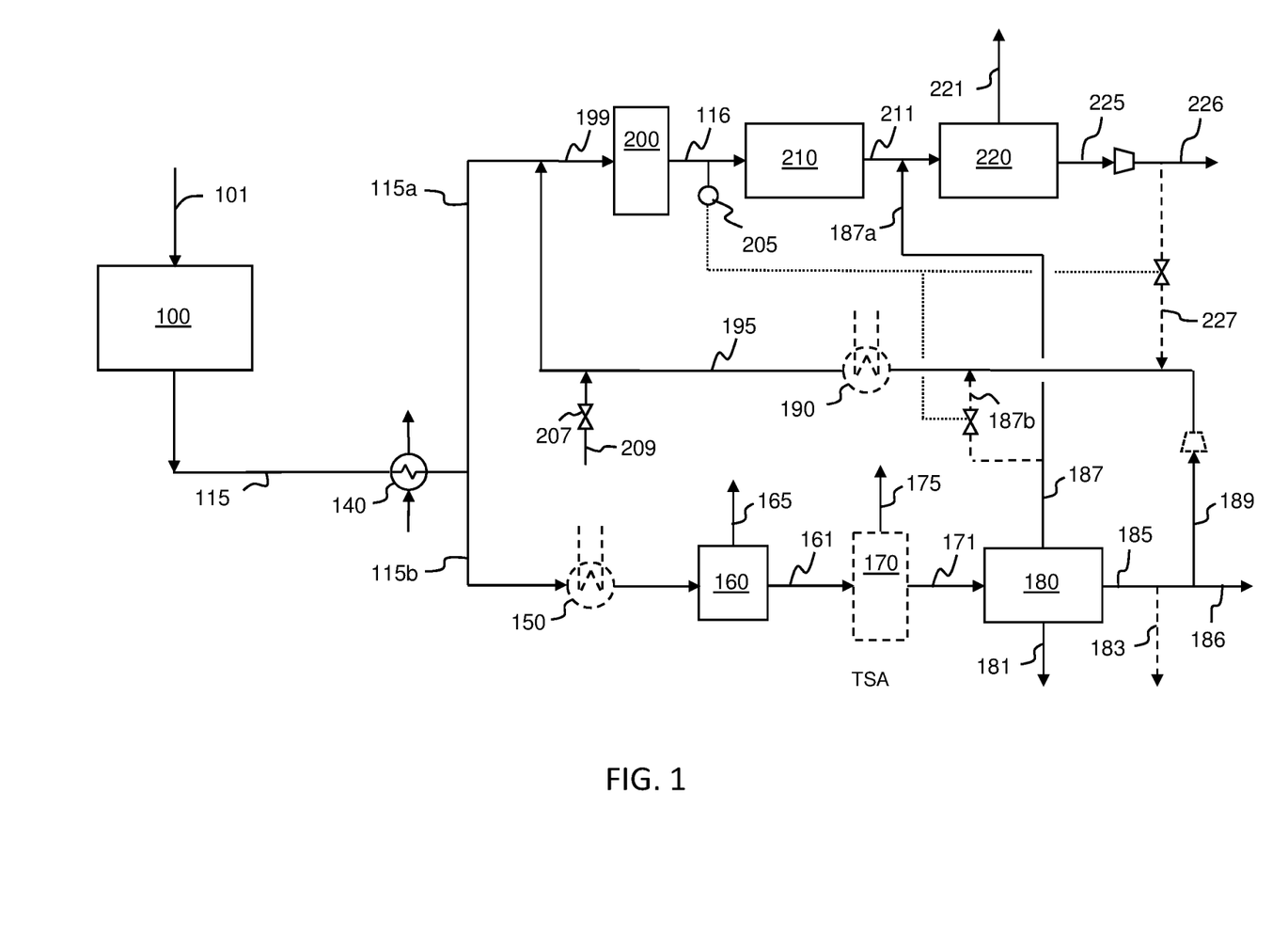
FIG. 1 is a process flow diagram of a system for producing a $H_2$-containing product and a CO-containing product.

FIG. 1 is a process flow diagram for the process and apparatus of a preferred embodiment for producing a $H_2$-containing product 225 and a CO-containing product 185 with CO-containing product turndown capability.

A production unit 100 produces a crude synthesis gas 115. A "crude synthesis gas" is defined herein as a gas comprising $H_2$, CO, and other gaseous components, for example, one or more of $H_2O$, $CH_4$, $N_2$, and $CO_2$. The production unit 100 has an inlet for introducing reactants 101 and an outlet for discharging the crude synthesis gas 115.

The production unit 100 may be a catalytic steam-hydrocarbon reformer, a partial oxidation unit (gasification unit), an autothermal reformer, or other unit known in the art for producing a crude synthesis gas. As used herein, the term "partial oxidation" includes the partial oxidation of a gas, liquid, or solid carbonaceous material, with or without a catalyst.

Figure 2:
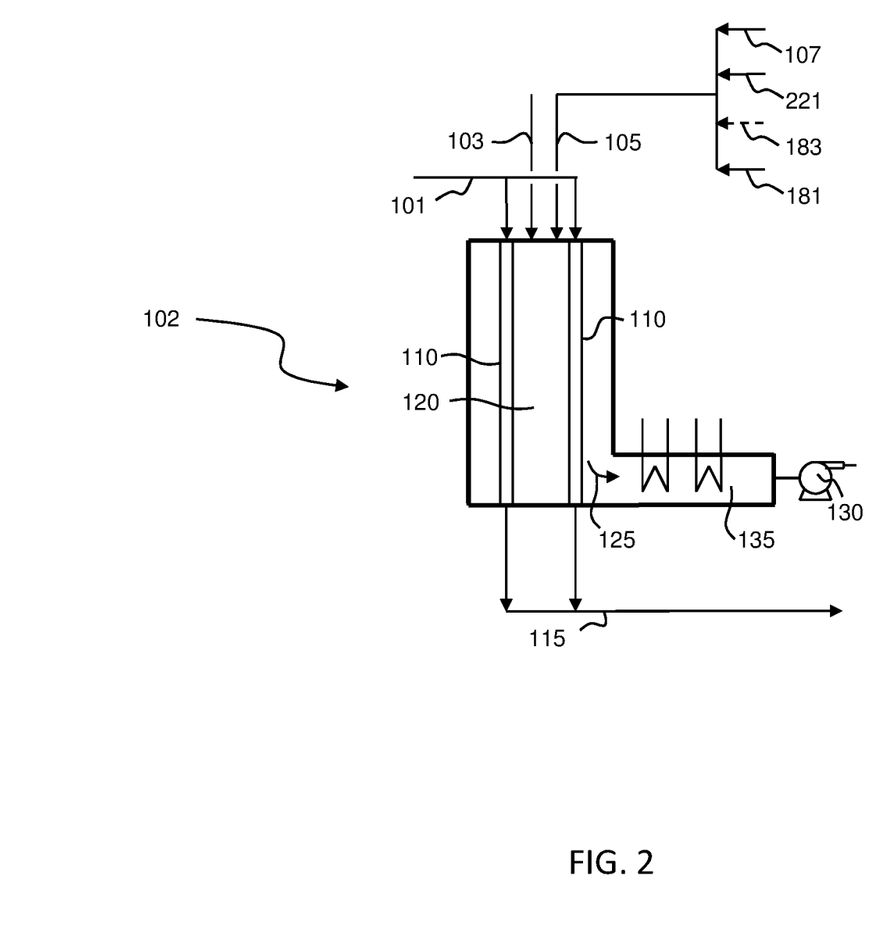
FIG. 2 is a schematic of a catalytic steam-hydrocarbon reformer.

The production unit 100 may be a catalytic steam-hydrocarbon reformer 102 as shown schematically in FIG. 2.

In case the production unit 100 is a catalytic steam-hydrocarbon reformer 102, a reformer feed gas 101 is introduced into a plurality of catalyst-containing reformer tubes 110 in the catalytic steam-hydrocarbon reformer 102. The reformer feed gas 101 is reacted in a reforming reaction under reaction conditions effective to form a reformate comprising $H_2$, CO, $CH_4$, and $H_2O$, and the reformate is withdrawn from the plurality of catalyst-containing reformer tubes 110 of the catalytic steam-hydrocarbon reformer 102 as the crude synthesis gas 115.

In case the production unit 100 is a catalytic steam-hydrocarbon reformer 102, the catalytic steam-hydrocarbon reformer 102 has a combustion (radiant) section 120. The combustion section contains the plurality of catalyst-containing reformer tubes 110. Each of the plurality of catalyst-containing reformer tubes 110 has an inlet and an outlet, wherein the outlet of the production unit 100 is in fluid flow communication with the outlet of each of the plurality of catalyst-containing reformer tubes 110.

A fuel 105 is combusted with an oxidant 103 in the catalytic steam-hydrocarbon reformer 102 external to the plurality of catalyst-containing reformer tubes 110 under reaction conditions effective to combust the fuel 105 to form a combustion product gas 125 and generate heat to supply energy for reacting the reformer feed gas 101 inside the plurality of catalyst-containing reformer tubes 110. The combustion product gas 125 is withdrawn from the catalytic steam-hydrocarbon reformer 102.

A waste heat boiler 140 may be used to cool the crude synthesis gas 115 withdrawn from the production unit 100. Steam may be produced in the waste heat boiler 140.

There are two processing trains: a first train for producing the $H_2$-containing product 225, and a second train for producing the CO-containing product 185.

The crude synthesis gas 115 is divided into a first divided portion 115a and a second divided portion 115b. The first divided portion 115a is passed to the process train for producing the $H_2$-containing product 225 and the second divided portion 115b is concurrently passed to the process train for producing the CO-containing product 185.

The first divided portion 115a of the crude synthesis gas 115 is passed to a shift reactor 200 as at least a part of the feed 199 to the shift reactor 200. The inlet of the shift reactor 200 is in downstream fluid flow communication with the outlet of the production unit 100. The inlet of the shift reactor 200 is operatively disposed to receive the first divided portion 115a of the crude synthesis gas 115 discharged from the outlet of the production unit 100.

The feed 199 to the shift reactor 200 is subjected to catalytic shift to convert CO to $CO_2$ by reaction with steam, with the concurrent production of more $H_2$. Minor impurities in the shift reactor feed, for example, dust, carbon, tar, hydrogen cyanide, nitrogen oxides, sulfur, and sulfur compounds are desirably removed before the shift reaction. Such preliminary purification may be affected by conventional techniques, for example, by a catalytic feed purification system comprising a hydrogenator reactor and desulfurizer unit (not shown), typically located upstream of the production unit 100.

The catalytic shift can be carried out in either of two broad ways.

In a first way, if thorough removal of sulfur and any other catalyst poisons is affected prior to shift, the following techniques are suitable:

"high temperature shift", using an inlet temperature in the range 330° C. to 400° C., an outlet temperature in the range 400° C. to 500° C., usually over an iron oxide/chromia catalyst, and affording in a single stage an outlet carbon monoxide content in a range of about 2% to about 5% by volume on a dry basis;

"low temperature shift", using an inlet temperature in a range of about 190° C. to about 230° C., an outlet temperature in a range of about 250° C. to about 300° C., usually over a catalyst comprising metallic copper, zinc oxide, and one or more other difficulty reducible oxides such as alumina or chromia, and affording an outlet carbon monoxide content in a range of about 0.1% to about 1.0%, especially under 0.5% by volume on a dry basis;

"combination", using the sequence of high temperature shift, cooling by indirect heat exchange, and low temperature shift; if desired, either shift stage can be subdivided with interbed cooling; and "medium temperature shift" in which the inlet temperature is in a range of about 190° C. to about 325° C. and the outlet temperature is up to about 430° C.: a suitably formulated supported copper catalyst can be used, and the outlet carbon monoxide content is typically up to about 2% by volume on a dry basis.

In a second way, if there is no sulfur removal before the shift reactor, or if there is a treatment, for example with an absorbent liquid, that removes some of the sulfur compounds, e.g. hydrogen sulphide, but only effects incomplete removal of other sulfur compounds, e.g. carbonyl sulphide, then sulfactive shift, otherwise known as "dirty", shift may be employed, wherein the crude synthesis gas is contacted with a cobalt-molybdenum sulphide catalyst. The temperature at the inlet is typically in the range of 200° to 350° C. and at the outlet 50° to 100° C. higher. The outlet carbon monoxide content is typically 0.5 to 4% by volume on a dry basis.

If the sulfactive form of shift is used, the crude synthesis gas is preferably desulphurised before it is passed to the pressure swing adsorption unit 220.

The above inlet and outlet temperatures refer to adiabatic shift catalyst beds. However, in the interest of energy recovery, catalytic shift may be operated in indirect heat exchange with a coolant, especially water under pressure. Thus, the catalyst can be disposed in tubes surrounded by water, or vice versa. Details of such a shift stage are given in EP-A-157480. If the crude synthesis gas has been cooled to purify it before shift, the temperature in the shift stage preferably rises from the inlet to the outlet.

After the crude synthesis gas is shifted in the shift reactor, shift reactor effluent 116 (shifted crude synthesis gas) is withdrawn from the shift reactor 200.

Heat may be recovered from the shift reactor effluent 116 in a heat transfer network of heat exchangers 210 where steam may be produced from the heat extracted from the crude synthesis gas, as is well-known in the art. Any desired network of heat exchangers may be used, for example, as disclosed in U.S. Pat. Nos. 8,828,107, 8,956,587, 9,586,819, and PCT Publ. No. WO 2012/078299. The heat transfer network of heat exchangers 210 may also include the waste heat boiler 140 and heat exchangers for cooling the second divided portion 115b of the crude synthesis gas 115.

Water may be condensed and removed from the crude synthesis gas after passing through the shift reactor 200 in the heat exchanger network 210 prior to passing the crude synthesis gas to the pressure swing adsorption unit 220.

The pressure swing adsorption unit has an inlet, a first outlet and a second outlet. The inlet of the pressure swing adsorption unit 220 is in downstream fluid flow communication with the outlet of the shift reactor 200. The inlet of the pressure swing adsorption unit 220 is operatively disposed to receive at least a portion of the shift reactor effluent, typically water-depleted, from the outlet of the shift reactor 200.

The pressure swing adsorption unit feed comprising water-depleted shift reactor effluent 211, is separated in the pressure swing adsorption unit 220 to form the $H_2$-containing product 225 and a pressure swing adsorption unit by-product gas 221, typically called "tail gas". $H_2$-containing product 225 is discharged from the first outlet of the pressure swing adsorption unit 220 and the pressure swing adsorption unit by-product gas 221 is discharged from the second outlet of the pressure swing adsorption unit 220. The pressure swing adsorption unit by-product gas 221 may be passed to the production unit 100 as a feed (including feed as a process gas and/or as a fuel) to the production unit during the primary operating mode and during the secondary operating (turndown) mode.

The pressures swing adsorption unit 220 may use any suitable pressure swing adsorption cycle. Pressure swing adsorption cycles comprise a number of well-known steps. The various steps of pressure swing adsorption cycles are described in EP 2823872 and US2014/0373713 (now U.S. Pat. No. 9,381,460), incorporated herein by reference. Specific pressure swing adsorption cycles are provided in companion articles "Pressure Swing Adsorption cycles for 4 to 7 adsorption beds," IP.com number 000241449, Apr. 29, 2015, and "Pressure Swing Adsorption cycles for 7 or more adsorption beds," IP.com number 000241619, May 18, 2015, available in print form in The IP.com Journal, each incorporated herein by reference.

In case the production unit 100 is a catalytic steam-hydrocarbon reformer 102, the pressure swing adsorption unit by-product gas 221 may be passed to the production unit 100 as a feed to the production unit as part of the fuel 105 for the reformer 102 as shown in FIG. 2.

In case the production unit 100 is a partial oxidation reactor, such as a coal gasifier, the pressure swing adsorption unit by-product gas 221 may be introduced into the partial oxidation reactor along with the carbonaceous feedstock.

In case the production unit 100 is an autothermal reformer, the pressure swing adsorption unit by-product gas 221 may be introduced into the autothermal reformer as part of the hydrocarbon feed.

The second divided portion 115b of the crude synthesis gas 115 may be cooled in one or more heat exchangers 150 and subsequently passed to $CO_2$ removal unit 160. The second divided portion 115b of the crude synthesis gas 115 is passed to the $CO_2$ removal unit concurrent with the first divided portion 115a being passed to the shift reactor 200. The one or more heat exchangers 150 may be part of the heat transfer network of heat exchangers 210. The $CO_2$ removal unit 160 may be any suitable unit for removing $CO_2$ known in the art, for example, a chemical (amine) wash (MDEA, MEA, DEA), a physical wash (Rectisol®) or selective adsorption.

Acid gas removal systems for synthesis gas applications are designed to remove primarily $CO_2$ and, in some cases, sulfur components. Acid gas removal systems comprise a single- or multi-stage adsorber column, solution regeneration equipment such as a stripper and/or a flash vessel, heat exchangers including a stripper reboiler, and pumps. There are two basic types of acid gas removal systems: chemical wash or physical wash. Examples of chemical wash include all amine-based systems (MEA, MDEA, DEA, DGA®, aMDEA®, UCARSOL™, Sulfinol®), and potassium carbonate Benfield process. Examples of physical wash include chilled methanol based Rectisol® system, and dimethylether or polyethylene glycol Selexol® system.

The $CO_2$ removal unit 160 has an inlet, a first outlet, and a second outlet. The inlet of the $CO_2$ removal unit 160 is in downstream fluid flow communication with the outlet of the production unit 100. The inlet of the $CO_2$ removal unit is operatively disposed to receive the second divided portion 115b of the crude synthesis gas 115 withdrawn from the outlet of the production unit 100.

$CO_2$ is separated from the second divided portion 115b of the crude synthesis gas 115 in the $CO_2$ removal unit to form a $CO_2$-depleted crude synthesis gas 161 and a $CO_2$-containing effluent 165. The $CO_2$-depleted crude synthesis gas 161 is discharged from the first outlet of the $CO_2$ removal unit and the $CO_2$-containing effluent 165 is discharged from the second outlet of the $CO_2$ removal unit 160.

In case the production unit 100 is a partial oxidation reactor using a solid carbonaceous feed (e.g. a coal gasifier), a portion of the $CO_2$-containing effluent 165 may be treated and compressed and used to transport the solid carbonaceous feed to the partial oxidation reactor.

The $CO_2$-depleted crude synthesis gas 161 from the $CO_2$-removal unit 160 may be separated in a temperature swing adsorption (TSA) unit 170. The temperature swing adsorption unit 170 may be required to remove any residual $CO_2$ and $H_2O$ left in the $CO_2$-depleted crude synthesis gas 161 after passing through the $CO_2$-removal unit 160 before cryogenic separation. Temperature swing adsorption units for removing $CO_2$ and $H_2O$ are well-known in the art. The TSA unit 170 has an inlet, a first outlet, and a second outlet. The inlet of the TSA unit 170 is in downstream fluid flow communication with the outlet of the $CO_2$ removal unit 160. A crude synthesis gas depleted of $CO_2$ and $H_2O$ and suitable as a cryogenic separation unit feed 171 is withdrawn from the first outlet of the TSA unit 170. A temperature swing adsorption unit by-product gas 175 containing $CO_2$ and $H_2O$ is withdrawn from the second outlet of the TSA unit 170.

A cryogenic separation unit feed 171 comprising at least a portion of the $CO_2$-depleted crude synthesis gas 161 is separated in a cryogenic separation unit 180 (referred to in the industry as a "cold box") to form the CO-containing product 185, a $H_2$-rich stream 187, and a cryogenic separation unit by-product 181. The cryogenic separation unit 180 may also form additional streams (not shown).

The cryogenic separation unit 180 has an inlet, a first outlet, a second outlet, and a third outlet. The inlet is in downstream fluid flow communication with the first outlet of the $CO_2$ removal unit 160 (via the first outlet of the TSA unit 170). The inlet of the cryogenic separation unit 180 is operatively disposed to receive at least a portion of the $CO_2$-depleted crude synthesis gas 161 from the outlet of the $CO_2$-removal unit 160. The CO-containing product 185 is discharged from the first outlet of the cryogenic separation unit 180, the $H_2$-rich stream 187 is discharged from the second outlet of the cryogenic separation unit 180, and the cryogenic separation unit by-product 181 is discharged from the third outlet of the cryogenic separation unit 180.

The CO-containing product 185 may be essentially pure CO, for example, having a CO concentration greater than 99 mole %. The CO-containing product 185 may be an "oxogas," a synthesis gas having a desired $H_2$ to CO molar ratio. The oxogas may, for example, have a $H_2$:CO molar ratio between 0.5 and 2.5.

The cryogenic separation unit 180 may contain any number of fractionators such as distillation columns, flash drums, rectification columns, stripping columns, and the like. The cryogenic separation unit 180 may contain a methane wash column.

Any suitable cryogenic separation unit 180 may be used to form the CO-containing product 185. Disclosures for cryogenic separation units for forming CO-containing products include U.S. Pat. Nos. 4,217,759, 4,488,890, 4,525,187, 4,566,886, 5,351,491, 5,609,040, 5,832,747, 6,161,397, and EP 2 414 282, incorporated herein by reference in their entirety.

The $H_2$-rich stream 187 has a relatively high $H_2$ concentration and is suitable as a feed to the pressure swing adsorption unit 220. At least a portion 187a of the $H_2$-rich stream 187 is passed to the pressure swing adsorption unit as part of the pressure swing adsorption unit feed. A process gas transfer line provides fluid flow communication between the second outlet of the cryogenic separation unit 180 and the inlet of the pressure swing adsorption unit 220 for transferring at least a portion 187a of the $H_2$-rich stream 187 from the second outlet of the cryogenic separation unit 180 to the inlet of the pressure swing adsorption unit 220.

The cryogenic separation unit by-product 181 generally contains about 75 to 80 vol. % $CH_4$, about 20 vol. % $H_2$, and about 1.5 vol. % CO, and can be passed to the production unit 100 as a feed (including feed as a process gas and/or as a fuel) to the production unit.

In case the production unit 100 is a catalytic steam-hydrocarbon reformer 102, the cryogenic separation unit by-product 181 may be passed to the catalytic steam-hydrocarbon reformer 102 as a feed to the catalytic steam-hydrocarbon reformer 102 as part of the fuel 105 for the catalytic steam-hydrocarbon reformer 102 as shown in FIG. 2.

In case the production unit 100 is a partial oxidation reactor, such as a coal gasifier, the cryogenic separation unit by-product 181 may be introduced into the partial oxidation reactor along with the carbonaceous feedstock.

In case the production unit 100 is an autothermal reformer, the cryogenic separation unit by-product 181 may be introduced into the autothermal reformer as part of the hydrocarbon feed.

The process is characterized by a primary (normal) operating mode and a secondary (CO turndown) mode, more specifically by the secondary (CO turndown) mode.

During the primary operating mode, a portion 226 of the $H_2$-containing product 225 is passed to storage, a customer, and/or a downstream process and a portion 186 of the CO-containing product 185 is passed to storage, a customer, and/or a downstream process.

During the secondary operating mode, a portion 226 of the $H_2$-containing product 225 is passed to storage, a customer, and/or a downstream process and a portion 186 of the CO-containing product 185 is passed to storage, a customer, and/or a downstream process where the flow rate of the portion 186 during the secondary operating mode is less than the flow rate of the portion 186 during the primary operating mode. The flow rate of the portion 186 of the CO-containing product 185 during the secondary operating mode may be zero.

The CO producing train has a design capacity for the production of CO. The design capacity is the theoretical maximum output of the CO producing train in a given period under ideal or standard conditions.

During the primary (normal) operating mode, CO may be produced at a molar flow rate from 80% to 100% of the design capacity for the CO producing train. During the secondary operating mode, the CO-containing product 185 may be produced at 25% to 70% or 30% to 50% of the design capacity molar flow rate.

During the primary operating mode, crude synthesis gas 115 is produced in the production unit 100 and the crude synthesis gas 115 is withdrawn from the production unit 100. The crude synthesis gas 115 is divided into the first divided portion 115a and the second divided portion 115b. The first divided portion is passed to the shift reactor as at least a part of the feed 199 to the shift reactor 200, reacted in the shift reactor to form the shift reactor effluent 116, and the shift reactor effluent 116 is withdrawn from the shift reactor 200. The second divided portion 115b of the crude synthesis gas 115 is passed to the $CO_2$ removal unit 160, $CO_2$ is separated from the second divided portion 115b in the $CO_2$ removal unit 160 to form the $CO_2$-depleted crude synthesis gas 161 and the $CO_2$-containing effluent 165.

During the primary operating mode, the pressure swing adsorption unit feed comprising the shift reactor effluent 116 is separated in the pressure swing adsorption unit 220 to form the $H_2$-containing product 225 and the pressure swing adsorption unit by-product gas 221.

During the primary operating mode, the cryogenic separation unit feed comprising at least a portion of the $CO_2$-depleted crude synthesis gas 161 is separated in the cryogenic separation unit 180 to form at least the CO-containing product 185, the $H_2$-rich stream 187, and the cryogenic separation unit by-product 181. At least a portion 187a of the $H_2$-rich stream 187 is passed to the pressure swing adsorption unit 220 as part of the pressure swing adsorption unit feed.

During the secondary operating mode, crude synthesis gas 115 is produced in the production unit 100 and the crude synthesis gas 115 is withdrawn from the production unit 100. The crude synthesis gas 115 is divided into the first divided portion 115a and the second divided portion 115b. The first divided portion is passed to the shift reactor as at least a part of the feed 199 to the shift reactor 200, reacted in the shift reactor to form the shift reactor effluent 116, and the shift reactor effluent 116 is withdrawn from the shift reactor 200. The second divided portion 115b of the crude synthesis gas 115 is passed to the $CO_2$ removal unit 160, $CO_2$ is separated from the second divided portion 115b in the $CO_2$ removal unit 160 to form the $CO_2$-depleted crude synthesis gas 161 and the $CO_2$-containing effluent 165.

During the secondary operating mode, the pressure swing adsorption unit feed comprising the shift reactor effluent 116 is separated in the pressure swing adsorption unit 220 to form the $H_2$-containing product 225 and the pressure swing adsorption unit by-product gas 221.

During the secondary operating mode, the cryogenic separation unit feed comprising at least a portion of the $CO_2$-depleted crude synthesis gas 161 is separated in the cryogenic separation unit 180 to form at least the CO-containing product 185, the $H_2$-rich stream 187, and the cryogenic separation unit by-product 181. At least a portion 187a of the $H_2$-rich stream 187 is passed to the pressure swing adsorption unit 220 as part of the pressure swing adsorption unit feed.

What distinguishes the secondary operating mode from the primary operating mode is that during the secondary operating mode, a portion 189 or all of the CO-containing product 185 is passed to the shift reactor 200 as part of the feed 199 to the shift reactor 200. Ordinarily, none of the CO-containing product 185 is passed to the shift reactor 200 as part of the feed to the shift reactor during the primary operating mode. In case a portion 189 of the CO-containing product 185 is passed to the shift reactor 200 during the primary operating mode, the distinguishing feature is that a greater molar flow rate of the portion 189 is passed to the shift reactor 200 during the secondary operating mode than during the primary operating mode.

Depending on the pressure of the CO-containing product 185, the portion 189 may be compressed in a compressor as the portion 189 of the CO-containing product 185 is passed to the shift reactor 200.

A process gas transfer line, where the inlet of the shift reactor 200 is in fluid flow communication with the first outlet of the cryogenic separation unit 180 via the process gas transfer line, provides the capability to pass the portion 189 or all of the CO-containing product 185 to the inlet of the shift reactor 200.

Depending on the design capacity of the shift reactor 200, all of the CO-containing product 185 may not be able to be processed in the shift reactor 200. In that case, a portion 183 of the CO-containing product 185 may be passed to the production unit 100 as a feed (including feed as a process gas and/or as a fuel) to the production unit 100 during the secondary operating mode.

In case the production unit 100 is a catalytic steam-hydrocarbon reformer 102, the portion 183 of the CO-containing product 185 may be passed to the production unit 100 as a feed to the production unit 100 during the secondary operating mode as part of the fuel 105 for the reformer 102 as shown in FIG. 2.

In case the production unit 100 is a partial oxidation reactor, such as a coal gasifier, the portion 183 of the CO-containing product 185 may be introduced into the partial oxidation reactor along with the carbonaceous feedstock.

In case the production unit 100 is an autothermal reformer, the portion 183 of the CO-containing product 185 may be introduced into the autothermal reformer as part of the hydrocarbon feed.

Since the shift reaction is exothermic, a higher molar flow rate of CO, and resulting higher molar concentration, in the feed 199 to the shift reactor 200 would increase the temperature in the shift reactor 200, if no other process modifications are made.

In the process, a $H_2$-containing gas and/or a $CO_2$-containing gas may be introduced into the shift reactor 200 as part of the feed 199 to the shift reactor 200 during the secondary operating mode. By adding $H_2$ and/or $CO_2$, the temperature of the shift reactor 200 can be moderated.

The $CO_2$-containing gas may be formed from the $CO_2$-containing effluent 165 from the $CO_2$ removal unit 160.

The H₂-containing gas maybe formed from a portion 227 of the H₂-containing product 225 and/or a portion 187b of the H₂-rich stream 187 from the cryogenic separation unit 180.

The flow rate of the portion 227 of the H₂-containing product 225 and/or the flow rate of the portion 187b of the H₂-rich stream 187 passed to the shift reactor 200 as part of the feed 199 to the shift reactor 200 during the secondary operating mode may be selected to maintain the temperature of the shift reactor effluent 116 and/or the temperature in the shift reactor 200 below a target maximum temperature. The target maximum temperature may be selected based on catalyst manufacturer specifications.

As shown in FIG. 1, a temperature sensor 205 may acquire the temperature of the shift reactor effluent 116 and provide a signal to a controller to adjust a valve to control the flow rate of H₂-containing gas. A temperature sensor (not shown) may acquire a temperature within the shift reactor 200 and provide a signal to a controller to adjust a valve to control the flow rate of H₂-containing gas.

Modeling of the shift reactor, for example using Aspen Plus® Software, may be used to determine a suitable flow rate of the portion 227 of the H₂-containing product 225 and/or the flow rate of the portion 187b of the H₂-rich stream 187 passed to the shift reactor 200 as part of the feed 199 to the shift reactor 200 during the secondary operating mode.

A process gas transfer line is provided for passing the H₂-containing gas to the inlet of the shift reactor 200. The H₂-containing gas may be heated in process gas heater 190 to provide a suitable temperature of the feed 199 to the shift reactor 200.

The process gas transfer line for providing the H₂-containing gas may provide fluid flow communication between the first outlet of the pressure swing adsorption unit 220 and the inlet of the shift reactor 200 to provide the portion 227 of the H₂-containing product 225 as the H₂-containing gas.

The process gas transfer line for providing the H₂-containing gas may provide fluid flow communication between the second outlet of the cryogenic separation unit 180 and the inlet of the shift reactor 200 to provide the portion 187b of the H₂-rich stream 187 as the H₂-containing gas.

In addition to the problem of overheating the shift catalyst in the shift reactor 200, care must be taken to avoid over-reduction of the shift catalyst in case the shift catalyst is an iron-based shift catalyst.

Over-reduction of the shift catalyst during the secondary operating mode can be avoided by introducing additional steam 209 with the feed 199 to the shift reactor 200. The addition or reduction of steam 209 and/or temperature of the steam 209 may also help with controlling the temperature of the shift catalyst in the shift reactor 200.

The additional steam 209 may be provided to the inlet of the shift reactor 200 by a process gas transfer line. The additional steam 209 may be produced in the heat transfer network of heat exchangers 210.

The propensity for shift catalyst over-reduction can be determined from a reduction factor (R) as is known in the art, for example as described in Smith R J et al., "A Review of the Water Gas Shift Reaction Kinetics," *Int. J. of Chem. Reactor Engg.*, Vol. 8, The Berkeley Electronic Press, 2010. Furthermore, manufacturers of iron-based shift catalyst typically provide information about conditions necessary to avoid over-reduction of their iron-based shift catalyst.

The reduction factor generally considers the CO concentration, $CO_2$ concentration, $H_2O$ concentration, and H₂ concentration.

The flow rate of the additional steam 209 passed as part of the feed 199 to the shift reactor 200 containing iron-based shift catalyst during the secondary operating mode may be selected to prevent over-reduction of the iron-based shift catalyst. The flow rate of additional steam 209 may be controlled as a function of the flow rate of the portion 189 of the CO-containing product 185.

The flow rate and/or temperature of the additional steam 209 passed as part of the feed 199 to the shift reactor 200 during the secondary operating mode may be controlled to maintain a temperature of the shift reactor effluent 116 leaving the shift reactor 200 below a target maximum temperature.

The flow rate and/or temperature of the additional steam 209 passed as part of the feed 199 to the shift reactor 200 during the secondary operating mode may be controlled to maintain a temperature in the shift reactor 200 below a target maximum temperature.

As the need for portion 186 of the CO-containing product 185 passed to storage, a customer, and/or a downstream process is decreased, the flow rate of divided portion 115b of the crude synthesis gas 115 is decreased and operation of the cryogenic separation unit 180 adjusted to accommodate the lower flow rates. Operation of cryogenic separation units at turndown conditions are known by those skilled in the art.

Since the flow rate of CO to the shift reactor 200 is increased during the secondary operating mode, additional H₂ will be formed and therefore additional H₂-containing product 225 will be produced from the pressure swing adsorption unit 220.

As a result, the production rate of the production unit 100 can be decreased and still produce the same amount of portion 226 of the H₂-containing product 225 passed to storage, a customer, and/or a downstream process during the secondary operating mode as during the primary operating mode.

Using the portion 189 of the CO-containing product 185 for the production of H₂ in the shift reactor 200 instead of using the CO for fuel or flaring improves the overall efficiency of the process during the secondary operating mode.

EXAMPLES

The process was simulated using AspenPlus® simulation software. The production unit 100 was a catalytic steam-hydrocarbon reformer like shown in FIG. 2.

Example 1

In example 1, the CO production train produces 35% of its design capacity for CO (i.e. a turndown case). Turn down to 35% corresponds to a typical minimum turndown capable for the CO production train.

Pressure swing adsorption tail gas is passed back to the catalytic steam-hydrocarbon reformer as fuel.

A portion (stream 183) of the CO that is produced is returned to the reformer as fuel. Another portion of the CO that is produced, stream 186, is flared. While some CO can be recycled back to the catalytic steam-hydrocarbon reformer as fuel, CO is a low heating value fuel, and there are limitations on the amount used as reformer fuel due to trim fuel constraints.

Table 1 provides a heat and material balance for the main process streams for example 1.

In this case the natural gas consumed for feed and (trim) fuel to the catalytic steam-hydrocarbon reformer is 585.8

GJ/h (HHV) to produce 1525.6 kmol/h $H_2$. The resulting gross efficiency 384.0 MJ/kmol $H_2$.

Example 2

In example 2, the CO production train produces the same amount of CO as in example 1, (35% of the design capacity for the CO production train). The CO that is produced is passed to the shift reactor inlet as stream 189.

Pressure swing adsorption tail gas is passed back to the catalytic steam-hydrocarbon reformer as fuel.

Table 2 provides a heat and material balance for the main process streams for example 2.

In this case the natural gas consumed for feed and (trim) fuel to the catalytic steam-hydrocarbon reformer is 523.2 GJ/h (HHV) to produce 1388 kmol/h $H_2$. The resulting gross efficiency 376.9 MJ/kmol $H_2$.

TABLE 1

| | Stream # | | | | | |
|---|---|---|---|---|---|---|
| | 115a | 199 | 116 | 226 | 183 | 186 |
| T (° C.) | 355 | 355 | 419 | 38 | 41 | 41 |
| P (MPa) | 3.25 | 3.25 | 3.20 | 4.5 | 1.7 | 1.70 |
| Flow (kmol/h) | 2060 | 2060 | 2060 | 1525.6 | 39.2 | 74.7 |
| | Mole fractions | | | | | |
| $H_2$ | 0.484 | 0.484 | 0.546 | 1.0 | — | — |
| $CH_4$ | 0.042 | 0.042 | 0.042 | — | — | — |
| $N_2$ | 0.001 | 0.001 | 0.001 | — | 0.006 | 0.006 |
| $CO_2$ | 0.052 | 0.052 | 0.114 | — | — | — |
| CO | 0.094 | 0.093 | 0.031 | — | 0.994 | 0.994 |
| $H_2O$ | 0.327 | 0.327 | 0.265 | — | — | — |

TABLE 2

| | Stream # | | | | | | | | | |
|---|---|---|---|---|---|---|---|---|---|---|
| | 115a | 189 | 227 | 195 | 209 | 199 | 116 | 226 | 183 | 186 |
| T (° C.) | 357 | 41 | 38 | 260 | 302 | 343 | 427 | 38 | 41 | — |
| P (MPa) | 3.25 | 1.70 | 3.45 | 3.38 | 3.90 | 3.25 | 3.20 | 4.5 | 1.7 | — |
| Flow (kmol/h) | 1700 | 74.7 | 109.1 | 183.8 | 121 | 2005 | 2005 | 1388 | 39.2 | 0 |
| | Mole fractions | | | | | | | | | |
| $H_2$ | 0.484 | — | 1.0 | 0.594 | — | 0.465 | 0.544 | 1.0 | — | — |
| $CH_4$ | 0.042 | — | — | — | — | 0.036 | 0.036 | | | |
| $N_2$ | 0.001 | 0.006 | — | 0.002 | — | 0.001 | 0.001 | — | 0.006 | — |
| $CO_2$ | 0.052 | — | — | — | — | 0.044 | 0.123 | | | |
| CO | 0.094 | 0.994 | — | 0.404 | — | 0.116 | 0.037 | — | 0.994 | — |
| $H_2O$ | 0.327 | — | — | — | 1.0 | 0.338 | 0.259 | | | |

What is claimed is:

1. A process for producing a $H_2$-containing product (225) and a CO-containing product (185) with CO-containing product turndown capability, the process comprising:

producing a crude synthesis gas (115) in a production unit (100), and withdrawing the crude synthesis gas (115) from the production unit (100);

dividing the crude synthesis gas (115) into a first divided portion (115a) and a second divided portion (115b);

passing the first divided portion (115a) of the crude synthesis gas (115) to a shift reactor (200) as at least part of the feed to the shift reactor (200), reacting the shift reactor feed in the shift reactor (200), and withdrawing a shift reactor effluent (116) from the shift reactor (200);

separating a pressure swing adsorption unit feed comprising at least a portion of the shift reactor effluent (116) from the shift reactor (200) in a pressure swing adsorption unit (220) to form the $H_2$-containing product (225) and a pressure swing adsorption unit by-product gas (221);

concurrent with passing the first divided portion (115a) of the crude synthesis gas (115) to the shift reactor (200), passing the second divided portion (115b) of the crude synthesis gas (115) to a $CO_2$ removal unit (160), separating $CO_2$ from the second divided portion (115b) in the $CO_2$ removal unit (160) to form a $CO_2$-depleted crude synthesis gas (161) and a $CO_2$-containing effluent (165);

separating a cryogenic separation unit feed (171) comprising at least a portion of the $CO_2$-depleted crude synthesis gas (161) in a cryogenic separation unit (180) to form at least the CO-containing product (185), a $H_2$-rich stream (187), and a cryogenic separation unit by-product (181); and passing at least a portion (187a) of the $H_2$-rich stream (187) to the pressure swing adsorption unit as part of the pressure swing adsorption unit feed;

wherein the process comprises a primary operating mode and a secondary operating mode;

wherein during the primary operating mode:
crude synthesis gas (115) is produced in the production unit (100), and the crude synthesis gas (115) is withdrawn from the production unit (100);

the crude synthesis gas (115) is divided into the first divided portion (115a) and the second divided portion (115b);

the first divided portion (115a) is passed to the shift reactor (200) as at least part of the feed to the shift reactor (200), reacted in the shift reactor to form the shift reactor effluent (116), and the shift reactor effluent (116) is withdrawn from the shift reactor (200);

the pressure swing adsorption unit feed comprising the shift reactor effluent (116) is separated in the pressure swing adsorption unit (220) to form the $H_2$-containing product (225) and the pressure swing adsorption unit by-product gas (221);

concurrent with passing the first divided portion (115a) as feed to the shift reactor (200), the second divided portion (115b) of the crude synthesis gas (115) is passed to the $CO_2$ removal unit (160), $CO_2$ is separated from the second divided portion (115b) in the $CO_2$ removal unit (160) to form the $CO_2$-depleted crude synthesis gas (161) and the $CO_2$-containing effluent (165);

the cryogenic separation unit feed comprising at least a portion of the $CO_2$-depleted crude synthesis gas (161) is separated in the cryogenic separation unit (180) to form at least the CO-containing product (185), the $H_2$-rich stream (187), and the cryogenic separation unit by-product (181); and at least a portion (187*a*) of the $H_2$-rich stream (187) is passed to the pressure swing adsorption unit as part of the pressure swing adsorption unit feed; and wherein during the secondary operating mode:

crude synthesis gas (115) is produced in the production unit (100), and the crude synthesis gas (115) is withdrawn from the production unit (100);

the crude synthesis gas (115) is divided into a first divided portion (115*a*) and a second divided portion (115*b*);

the first divided portion (115*a*) is passed to the shift reactor (200) as at least part of the feed to the shift reactor (200), reacted in the shift reactor to form the shift reactor effluent (116), and the shift reactor effluent (116) is withdrawn from the shift reactor (200);

the pressure swing adsorption unit feed comprising shift reactor effluent (116) is separated in the pressure swing adsorption unit (220) to form the $H_2$-containing product (225) and pressure swing adsorption unit by-product gas (221);

concurrent with passing the first divided portion (115*a*) as feed to the shift reactor (200), the second divided portion (115*b*) of the crude synthesis gas (115) is passed to the $CO_2$ removal unit (160), $CO_2$ is separated from the second divided portion (115*b*) in the $CO_2$ removal unit (160) to form the $CO_2$-depleted crude synthesis gas (161) and the $CO_2$-containing effluent (165);

the cryogenic separation unit feed comprising at least a portion of the $CO_2$-depleted crude synthesis gas (161) is separated in the cryogenic separation unit (180) to form at least the CO-containing product (185), the $H_2$-rich stream (187), and the cryogenic separation unit by-product (181); and at least a portion (187*a*) of the $H_2$-rich stream (187) is passed to the pressure swing adsorption unit as part of the pressure swing adsorption unit feed; and a portion (189) or all of the CO-containing product (185) is passed to the shift reactor (200) as part of the feed to the shift reactor (200).

2. The process as claimed in claim 1 wherein a $H_2$-containing gas is introduced into the shift reactor (200) as part of the feed to the shift reactor (200) during the secondary operating mode.

3. The process as claimed in claim 2 wherein the $H_2$-containing gas is at least one of a portion (227) of the $H_2$-containing product (225) or a portion (187*b*) of the $H_2$-rich stream (187).

4. The process as claimed in claim 2 or claim 3 wherein the flow rate of the $H_2$-containing gas passed to the shift reactor (200) as part of the feed to the shift reactor (200) during the secondary operating mode is selected to maintain a temperature in the shift reactor below a target maximum temperature and/or to maintain a temperature of the shift reactor effluent (116) leaving the shift reactor (200) below a target maximum temperature.

5. The process as claimed in any one of claims 1 to 4 wherein additional steam (209) is passed to the shift reactor (200) as part of the feed to the shift reactor (200) during the secondary operating mode.

6. The process as claimed in claim 5 wherein the shift reactor contains an iron-based shift catalyst, and wherein the flow rate of the additional steam (209) passed to the shift reactor (200) as part of the feed to the shift reactor (200) during the secondary operating mode is selected to prevent over-reduction of the iron-based shift catalyst.

7. The process as claimed in any one of the preceding claims wherein none of the CO-containing product (185) is passed to the shift reactor (200) as part of the feed to the shift reactor during the primary operating mode and/or wherein all of the CO-containing product (185) is passed to the shift reactor (200) as part of the feed to the shift reactor during the secondary operating mode.

8. The process as claimed in any one of the preceding claims wherein a portion (183) of the CO-containing product (185) is passed to the production unit (100) as a feed to the production unit (100) during the secondary operating mode.

9. The process as claimed in any one of the preceding claims further comprising:

separating the $CO_2$-depleted crude synthesis gas (161) from the $CO_2$-removal unit (160) in a temperature swing adsorption unit (170) to form the cryogenic separation unit feed (171) and a temperature swing adsorption unit by-product gas (175).

10. An apparatus for producing a $H_2$-containing product (225) and a CO-containing product (185) with CO-containing product turndown capability, the apparatus comprising a production unit (100) for producing a crude synthesis gas (115), the production unit (100) having an inlet and an outlet;

a shift reactor (200) having an inlet and an outlet, the inlet of the shift reactor (200) in fluid flow communication with the outlet of the production unit (100);

a pressure swing adsorption unit (220) having an inlet, a first outlet, and a second outlet, the inlet of the pressure swing adsorption unit (220) in fluid flow communication with the outlet of the shift reactor (200);

a $CO_2$ removal unit (160) having an inlet, a first outlet and a second outlet, the inlet of the $CO_2$ removal unit (160) in fluid flow communication with the outlet of the production unit (100);

a cryogenic separation unit (180) having an inlet, a first outlet, a second outlet, and a third outlet, the inlet in fluid flow communication with the first outlet of the $CO_2$ removal unit (160);

a first process gas transfer line, wherein the inlet of the shift reactor (200) is in fluid flow communication with the first outlet of the cryogenic separation unit (180) via the first process gas transfer line; and a second process gas transfer line, wherein the inlet of the pressure swing adsorption unit (220) is in fluid flow communication with the second outlet of the cryogenic separation unit (180) via the second process gas transfer line.

11. The apparatus as claimed in claim 10 further comprising a process gas transfer line for passing a $H_2$-containing gas to the inlet of the shift reactor (200).

12. The apparatus as claimed in claim 11 wherein the process gas transfer line for passing a $H_2$-containing gas provides fluid flow communication between the first outlet of the pressure swing adsorption unit (220) and the inlet of the shift reactor (200) and/or provides fluid flow communication between the second outlet of the cryogenic separation unit (180) and the inlet of the shift reactor (200).

13. The apparatus as claimed in any one of the preceding claims 10 to 12 further comprising
a process gas transfer line for passing additional steam (209) to the inlet of the shift reactor (200).

14. The apparatus as claimed in any one of the preceding claims 10 to 13
wherein the outlet of the production unit is for discharging a crude synthesis gas (115) formed in the production unit;
wherein the inlet of the shift reactor (200) is operatively disposed to receive a first divided portion of the crude synthesis gas (115) discharged from the outlet of the production unit;
wherein the inlet of the pressure swing adsorption unit (220) is operatively disposed to receive at least a portion of a shift reactor effluent from the outlet of the shift reactor (200), the first outlet of the pressure swing adsorption unit (220) is for discharging the $H_2$-containing product (225), and the second outlet of the pressure swing adsorption unit (220) is for discharging a pressure swing adsorption unit by-product gas (221);
wherein the inlet of the $CO_2$ removal unit (160) is operatively disposed to receive a second divided portion of the crude synthesis gas withdrawn from the outlet of the production unit, the first outlet of the $CO_2$ removal unit (160) is for discharging a $CO_2$-depleted crude synthesis gas (161), and the second outlet of the $CO_2$ removal unit is for discharging a $CO_2$-containing effluent (165);
wherein the inlet of the cryogenic separation unit (180) is operatively disposed to receive at least a portion of the $CO_2$-depleted crude synthesis gas (161) from the outlet of the $CO_2$-removal unit (160), the first outlet of the cryogenic separation unit (180) is for discharging a CO-containing product (185), and the second outlet of the cryogenic separation unit (180) is for discharging a $H_2$-rich stream (187);
wherein the first process gas transfer line is for passing a portion (189) or all of the CO-containing product (185) from the first outlet of the cryogenic separation unit (180) to the inlet of the shift reactor (200);
wherein the second process gas transfer line is for passing at least a portion (187a) of the $H_2$-rich stream (187) from the second outlet of the cryogenic separation unit (180) to the inlet of the pressure swing adsorption unit (220).

15. The apparatus as claimed in any one of the preceding claims 10 to 14 further comprising a temperature swing adsorption unit (170) having an inlet, a first outlet, and a second outlet, the inlet of the temperature swing adsorption unit (170) in fluid flow communication with the outlet of the $CO_2$ removal unit (160), and the inlet of the cryogenic separation unit (180) in fluid flow communication with the first outlet of the temperature swing adsorption unit (170).

* * * * *